United States Patent [19]
Heller

[11] Patent Number: 5,948,567
[45] Date of Patent: Sep. 7, 1999

[54] BATTERY PASTE DISPERSANT

[75] Inventor: David B. Heller, North Wales, Pa.

[73] Assignee: Geo Specialty Chemicals, Inc., Cleveland, Ohio

[21] Appl. No.: 09/005,952

[22] Filed: Jan. 9, 1998

Related U.S. Application Data

[60] Provisional application No. 60/035,292, Jan. 10, 1997, and provisional application No. 60/036,978, Jan. 29, 1997.

[51] Int. Cl.⁶ .................................................... H01M 4/56
[52] U.S. Cl. ......................... 429/228; 429/225; 429/227; 429/215; 29/623.1
[58] Field of Search .................................... 429/225, 227, 429/228, 215; 29/623.1

[56] References Cited

U.S. PATENT DOCUMENTS

| | | | |
|---|---|---|---|
| 3,481,785 | 12/1969 | Ikari | 136/26 |
| 4,071,470 | 1/1978 | Davidson et al. | 252/389 R |
| 4,666,528 | 5/1987 | Arrington et al. | 134/2 |
| 4,808,407 | 2/1989 | Hein | 424/141 |
| 4,859,787 | 8/1989 | Spiess | 558/235 |
| 4,902,535 | 2/1990 | Garg et al. | 427/292 |
| 4,937,143 | 6/1990 | West | 427/419.8 |

FOREIGN PATENT DOCUMENTS

| | | |
|---|---|---|
| 5636862 | 8/1979 | Japan . |
| 56048070 | 9/1979 | Japan . |
| 703873 | 6/1978 | U.S.S.R. . |

OTHER PUBLICATIONS

International Search Report Mar. 1998.

*Primary Examiner*—Bruce F. Bell
*Attorney, Agent, or Firm*—Thompson Hine & Flory LLP

[57] ABSTRACT

A battery paste for a lead oxide battery plate comprising lead oxide, sulfuric acid and a naphthalene sulfonic acid formaldehyde condensate, the condensate being water soluble and having a molecular weight of about 9,000 to 15,000; methods for preparing the battery paste are also disclosed.

15 Claims, No Drawings

BATTERY PASTE DISPERSANT

CROSS-REFERENCE TO RELATED APPLICATION(S)

This application claims priority of U.S. Provisional Patent Application Serial Nos. 60/035,292 filed Jan. 10, 1997 and 60/036,978 filed Jan. 29, 1997.

BACKGROUND OF INVENTION

So-called lead-acid batteries are batteries in which the electrical current producing mechanism consists of a chemical reaction between certain lead compounds and an aqueous solution of sulfuric acid. Such batteries have been produced for well over one hundred years and have been used in a plurality of applications ranging from motive power propulsion to hand held audiovisual products. From humble beginnings, the lead-acid manufacturing industry has created a multibillion dollar world wide infrastructure truly indispensable to modern civilization.

Despite the enormous growth in volume, however, many of the manufacturing processes have changed very little, and in some cases not at all, since the first batteries were made a century ago. These early batteries consisted of two or more plates separated by a wooden separator and immersed in a solution of sulfuric acid in water. Each plate comprises a semi-rigid lead metal or lead-alloy grille-like structure whose openings are filled with a pasty mass of compounds which are mainly lead oxide, lead sulfates and water. Wooden separators are used to prevent the positive and negative plate from shorting out and rendering it useless. However these separators limited the life of the battery because they had an inherent stability problem in the battery acid solution and deteriorated in the high acid environment. A vast improvement was made when new, rubber-based separators were introduced. These separators ware stable in the battery acid and would allow the battery to no longer be limited by the life of the wooden separator. Unfortunately, the batteries could not be recharged fully and lost cap city. To fix this problem, ground up wood chips were added to the battery paste. The battery then could be recharged fully. It was subsequently determined that lignin was the chemical in the wooden separator which was essential to recharging the battery. Without it, the battery would not maintain its electrical capacity. This ingredient was identified as lignosulfonate, a material found in wood. This material influenced the battery's charge acceptance and its capacity. It is essential to the lead acid battery performance and is used in all lead acid batteries. Unfortunately, it was found that the lignosulfonate inhibited the formation of the battery plate. To overcome this slow process, carbon black was added to the paste. Carbon is considered an oxidation source in the battery, after the plates are formed, carbon black is likely a detractor from the life of the battery. Battery expanders contain carbon black, blanc fixe (barium sulfate) and lignosulfonate. The blanc fixe acts as a seed crystal for the lead to lead sulfate reaction. The blanc fixe must be fully dispersed in the paste in order for it to be effective. The lignosulfonate prevents the negative plate from forming a solid mass of lead sulfate during the discharge cycle. It enables the formation of long needle like crystals. The long crystals have more surface area and are easily converted back to the original state on charging. The carbon black increases the formation speed during the "curing" of the battery. Lignosulfonates inhibit the formation of the battery plate. The carbon black counteracts this problem.

Unfortunately, batteries are very sensitive to the type of lignin that is used. Lignin is a by-product of paper making and is sensitive to the type of tree harvested in addition to the papermaking process. Much testing must be done before each particular batch of lignin is determined to be suitable for use in a battery. The only reliable test method is to manufacture test batteries and check their charge acceptance over time. Once the particular batch of lignin is approved, it can be sold to other battery manufacturers to use in their batteries.

Another drawback of lignins is their heat sensitivity. They will breakdown in high temperature environments. The automotive battery industry is requiring smaller batteries which are just as efficient as the larger ones. The automobile is also placing the battery in areas that can be exposed.

SUMMARY OF INVENTION

One object of this invention is to replace the natural based, batch sensitive lignin conventionally used as an expander in battery pastes with a sulfonated aromatic dispersant that is synthetic in nature and readily reproduced. The sulfonated aromatic dispersant allows for a complete dispersion of the blanc fixe with inexpensive mixing equipment. It has been found that sulfonated aromatic dispersant is a more effective expander than lignosulfonate and can be used to speed up the formation of the battery plate. The sulfonated aromatic dispersant is believed to function to improve dispersion of barium sulfate in the paste, reduce hydroset time, produce a stronger plate which is resistant to plate breakage, to reduce fine lead particles and thereby improve handling and to improve pasting characteristics. It extends the life of the battery by increasing the end of charge voltage. The sulfonated aromatic dispersant can be used in about one-half to one-third the amount of lignosulfonate and is stable to higher temperatures than lignosulfonate.

The sulfonated aromatic dispersant used in the invention is a condensation product of naphthalene sulfonic acid and formaldehyde having a molecular weight of about 9,000 to 15,000. It has been found that lower molecular weight condensates (e.g., condensates having a molecular weight of 4,000) are not nearly as effective in improving the cycle life of a battery as the higher molecular weight condensates used in the present invention. One condensate that can be used is commercially available from Geo Speciality Chemicals under the tradename LOMAR®B.

The naphthalene sulfonic acid condensate can be used in positive and negative battery pastes in an amount of about 0.01 to 1.0% by weight based on the amount of PbO. In a positive paste, the condensate is typically used in an amount of 0.01 to 0.5% in a negative paste it is used in an amount of about 0.1 to 1.0%. The condensate is used to the exclusion of any lignosulfonate. The condensate is water soluble (e.g., it can easily be dissolved in water in amounts over 200 and more typically over 300 g/l at room temperature) and preferably has a high degree of sulfonation, e.g., about 70 to 100%. The condensate is cationic and can be used in the form of the acid or the hydrogen cation can be exchange for a sodium, calcium, lithium, potassium, zinc, barium, lead, antimony, copper, nickel, manganese, titanium, magnesium or zirconium cation.

Battery pastes can be prepared in a conventional manner. A negative paste typically comprises lead oxide, blanc fixe, carbon black, sulfuric acid and the condensate. A positive paste typically comprises lead oxide, sulfuric acid and the condensate. The amounts of lead oxide, barium sulfate, carbon black and sulfuric acid can vary within conventional limits.

The use of the water soluble, high molecular weight condensate also facilitates blending which in some cases can provide a more efficient manufacturing process. Often the best paste mixing equipment does not quite make a uniform mix because of the difficulties in homogenizing a putty-like and heavy mass. The stiffness of the final mix leads to numerous jams in pasting machine operations since the semi-rigid grid must be forced through a stiff putty-like mass and is often broken or distorted in the operation. After the paste has been applied to the grid, a set of steel and rubber blades remove any excess paste. The blades must be flexible in order to adjust automatically to various grid thickness. Very stiff paste, or partially dried paste, makes it extremely difficult to control paste mass since the flexible blades are prevented from returning to their adjusted position by the resistance of the stiff paste to the shearing action required for accurate paste application. A stiff paste will always over paste the grid, and result in excess costs, poor battery performance and oversize groups which complicate, final battery assembly. Thin pastes, on the other hand, result in hollow area in the paste surface and inadequate active material for satisfactory battery capacity and life. By using the aforementioned condensate a procedure can be employed which yields better uniformity in the paste.

EXAMPLE 1

According to the present invention a negative plate paste mix is made by loading the mixing machine with 1200 pounds of lead oxide, adding 72 liters of water in which one kilogram of a naphthalene sulfonic acid formaldehyde polymer known in the chemical trade as "Lomar®". One kilogram of carbon black and 3.75 kilograms of blanc fixe are also added to the mix which is then subjected to high intensity mixing for a period of no more than one minute. Forty eight-thousand milliliters of a 50% by weight solution of sulfuric acid are now added during the second minute of mixing again with rapid stirring and high intensity mixing. The addition of this quantity of sulfuric acid solution generates sufficient exothermic heat to bring the temperature of the mass to above the boiling point of water. At this stage the mix has a consistency of a thin slurry, and all components are uniformly distributed throughout the mass. In addition, and of equal importance, all chemical reactions which normally take place during customary slow mixing and at modest temperatures and for several subsequent curing days are completed within before the mix is applied to the grids. These reactions are commonly referred to as the plate formation when large quantities of tetrabasic lead are formed. The negative mix now comprises tetrabasic lead sulfate, lead hydrate and water. The stabilized paste mix produces plates which are basically stable and produce batteries with improved capacity and life as well as higher use efficiency of the lead content.

Final rheology control is achieved by adding 5 to 10 liters of concentrated sulfuric acid over the next 3 minutes. The total mixing time is 5 minutes compared to 30 to 45 minutes under the present state of the art.

At this point the mix may be used in either of two methods to produce positive battery plates. The addition of 10 liters of concentrated acid reestablished the past consistency or rheology required or conventional pasting machines.

The negative past mix was made by adding 120 ml of water containing 2.0 grams of Lomar®B to a blend of one kilogram of lead oxide, 2.0 grams of carbon black and 7.5 grams of blanc fixe. The resultant slurry was mixed for one minute, at which time 80 ml of a 50% aqueous sulfuric acid solution was added and the mixing continued for an additional minute. Five ml of concentrated sulfuric acid was then added during continued mixing over a 30 second period.

The mixer was stopped and suitable grids were pasted with the mixture and scraped to remove excess paste. The plates were dried overnight in an oven heated to 150 degrees Fahrenheit. Two dried positive plates were each wrapped in a 0.010" thick porous polyethylene separator sheet. A single dried negative plate was wrapped in a 0.040" thick absorptive glass mat. A three-plate cell was assembled using the single negative plate between the two positive plates. Sulfuric acid solution with a concentration of 1.235 specific gravity was added and the cell was placed on charge at 0.500 amperes for a period of 72 hours.

The charger voltage was limited to 2.7 volts maximum and the cell had reached this voltage in the 72 hour period. At this time the positive plate was 2.44 volts against a cadmium electrode. The cell was discharged at ten amperes and recharged at 0.500 amperes for 8 cycles. The absence of lignin did not adversely affect the charge acceptance of the battery. The addition of a condensed aromatic sulfonate aided in the dispersion of the blanc fixe and carbon black. The negative plate using the condensed aromatic sulfonate was more durable and the paste did not flake off as readily as a lignin plate.

EXAMPLE 2

A positive plate paste mix is made by loading a mixing machine with 1200 or 2400 pounds of lead oxide, adding 72 or 144 liters of water in which one or two kilograms respectively of a naphthalene sulfonic acid formaldehyde polymer having a molecular weight of about 10,000 and subjecting the mixture to high intensity mixing for a period of no more than one minute. 48 liters of a 50% by weight solution of sulfuric acid is now added during the second minute of mixing again with rapid stirring and high intensity mixing. The addition of this quantity of sulfuric acid solution generates sufficient exothermic heat to bring the temperature of the mass to above the boiling point of water. At this stage the mix has a consistency of a thin slurry, and all components are uniformly distributed throughout the mass. In addition, and of equal importance, all chemical reactions which normally take place during customary slow mixing and at modest temperatures and for several subsequent curing days are completed within before the mix is applied to the grids. The positive mix comprises tetrabasic lead sulfate, lead hydrate and water; the negative differs from the positive mix only in the small addition agents carbon black and barium sulfate. The stabilized paste mix produces plates which are basically stable and produce batteries with improved capacity and life as well as higher use/efficiency of the lead content.

Final rheology control is achieved by adding 5 to 10 liters of concentrated sulfuric acid over the next 3 minutes. The total mixing time is 5 minutes compared to 30 to 45 minutes under the present state of the art. At this point the mix may be used in either of two methods to produce positive battery plates. The addition of 10 liters of concentrated acid reestablished the paste consistency or rheology required or conventional pasting machines.

Another method of pasting plates is possible with these high intensity mixes. In some cases the use of a simplified paste application procedure possible only with accurate rheology control. The uniformity of the paste mixture and its unique unctuousness permits paste application to the grids by a simplified dipping procedure as described below.

Final rheology control is achieved by adding 5 liters of concentrated sulfuric acid to the slurry over a period of 3 minutes. Grids as thin as 0.010 inch thick, and cast from soft lead or lead alloy may be dipped into the mix and simply wiped clean of excess paste before drying and assembly into cell groups.

An example of the latter procedure is described below. The positive plate mix was made by adding 120 ml of water containing 2.0 grams of "Lomar®" to one kilogram of lead oxide. The resultant slurry mixed for one minutes, at which time 80 ml of a 50% aqueous sulfuric solution was added and the mixing was continued for an additional minute. Five ml of concentrated sulfuric acid was added during continued mixing over a 30 second period. The mixer was stopped and suitable grids were dipped into the mixture and wiped to remove excess paste. The plates were dried overnight in an oven heated to 150 degrees Fahrenheit.

The negative paste mix was made by adding 120 ml of water containing 2.0 grams of "Lomar®" to a blend of one kilogram of lead oxide, 2.0 grams of carbon black and 7.5 grams of blanc fixe. The resultant slurry was mixed for one minute, at which time 80 ml of a 50% aqueous sulfuric acid solution was added and the mixing continued for an additional minute. Five ml of concentrated sulfuric acid was then added during continued mixing over a 30 second period. The mixer was stopped and suitable grids were dipped into the mixture and wiped to remove excess paste. The plates were dried overnight in an oven heated to 150 degrees Fahrenheit.

Two dried positive plates were each wrapped in a 0.010" thick porous polyethylene separator sheet. A single dried negative plate was wrapped in a 0.040" thick absorptive glass mat. A three-plate cell was assembled using the single negative plate between the two positive plates. Sulfuric acid solution with a concentration of 1.235 specific gravity was added and the cell was placed on charge at 0.500 amperes for a period of 72 hours.

The charger voltage was limited to 2.7 volts maximum and the cell had reached this voltage in the 72 hour period. At this time the positive plate was 2.44 volts again a cadmium electrode and the negative voltage was –0.28 volts against a cadmium electrode. The cell was discharged at ten amperes and recharged at 0.500 amperes for 8 cycles.

In accordance with another embodiment of the invention, water and the condensate can be added to the lead oxide (e.g., Barton or ball milled lead oxide) at the site at which it is obtained. The addition of both water and condensate turns the dry potentially polluting powder into a thin slurry which can be transported long distances and delivered to the battery manufacturing site and made into a paste in accordance with the foregoing procedures. Since the dry lead oxide powder is non-dusting it can be delivered, stored, and used without either pollution of physical loss during all subsequent operations enumerated above. In addition, the slurry contains the same proportion of water as a conventional mix. The amount of water and condensate added to the lead oxide may vary but typically about 10 to 20% water and about 0.5 to 3% condensate may be used. In one case the addition of about 260 liters of water and four pounds of condensate per ton of lead oxide worked well. The mixture is stirred rapidly using a so called "lightning mixer" or equivalent or other mixing device and the mixture is pumped and stored in ordinary liquid storage tanks. Positive storage battery pastes are made from the material as received. Negative pastes are made by adding a prescribed quantity of carbon black and blanc fixe.

Having described the invention in detail and by reference to the preferred embodiments thereof, it will be apparent that numerous variations are possible without departing from the scope of the invention as defined by the following claims.

I claim:

1. A battery paste for a lead oxide battery plate consisting essentially of lead oxide, sulfuric acid and a naphthalene sulfonic acid formaldehyde condensate, said condensate being water soluble and having a molecular weight of about 9,000 to 15,000.

2. The battery paste of claim 1 wherein the paste contains about 0.01 to 1.0% by weight condensate.

3. The battery paste of claim 2 wherein the condensate has a sulfonation degree of about 70 to 100%.

4. The battery paste of claim 1 wherein the paste is a positive paste.

5. A battery plate coated with the battery paste of claim 1.

6. A battery incorporating the battery plate of claim 5.

7. A process for producing a battery paste for a lead oxide battery plate which comprises:

forming an aqueous solution of naphthalene sulphonic acid formaldehyde condensate;

adding the aqueous solution of naphthalene sulphonic acid formaldehyde condensate to a quantity of lead oxide;

mixing the aqueous solution of naphthalene sulphonic acid formaldehyde condensate and lead oxide to form a blend;

adding sulfuric acid to the blend to form a battery paste slurry.

8. The process of claim 7 wherein said condensate has a molecular weight of about 9,000 to 15,000.

9. The process of claim 8 wherein the condensate is present at a level from 0.01% to 1% based on the quantity of lead oxide.

10. The process of claim 7 wherein the battery paste is a positive plate paste and the condensate is present at a level from 0.01% to 0.5% based on the quantity of lead oxide.

11. The process of claim 7, further comprising the step of adding carbon black and barium sulfate to form the blend.

12. The process of claim 11 wherein the battery paste is a negative plate paste and the condensate is present at a level from 0.1% to 1% based on the quantity of lead oxide.

13. A battery paste produced by the process of claim 7.

14. A process for producing a lead oxide premix slurry for use in making a battery paste which comprises:

forming an aqueous solution of naphthalene sulphonic acid formaldehyde condensate;

adding the aqueous solution of naphthalene sulphonic acid formaldehyde condensate to a quantity of lead oxide; and mixing the aqueous solution of naphthalene sulphonic acid formaldehyde condensate and lead oxide to form the lead oxide premix.

15. A process for pasting battery plates which comprises:

forming an aqueous solution of naphthalene sulphonic acid formaldehyde condensate;

adding the aqueous solution of naphthalene sulphonic acid formaldehyde condensate to a quantity of lead oxide;

mixing the aqueous solution of naphthalene sulphonic acid formaldehyde condensate and lead oxide to form a blend;

adding sulfuric acid to the blend to form a battery paste slurry;

dipping a battery plate grid into the battery paste slurry to effectively cover the plate grid with battery paste;

removing excess battery paste slurry from the plate grid; and drying the plate grid.

* * * * *